United States Patent
Kai (10) Patent No.: US 8,067,812 B2
(45) Date of Patent: Nov. 29, 2011

(54) ACCELERATION SENSOR AND METHOD OF PRODUCING THE SAME

(75) Inventor: Takayuki Kai, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/706,281

(22) Filed: Feb. 15, 2007

(65) Prior Publication Data

US 2007/0261490 A1 Nov. 15, 2007

(30) Foreign Application Priority Data

May 10, 2006 (JP) ................................. 2006-131755

(51) Int. Cl.
*G01L 9/00* (2006.01)
(52) U.S. Cl. .................. 257/419; 73/514.37; 438/52
(58) Field of Classification Search .................. 438/50, 438/48, 52; 257/414–420; 73/514.01, 514.15, 73/514.36, 514.37
See application file for complete search history.

(56) References Cited

U.S. PATENT DOCUMENTS

| | | | | |
|---|---|---|---|---|
| 4,104,920 A | * | 8/1978 | Albert et al. | 73/514.14 |
| 5,396,798 A | * | 3/1995 | Frische | 73/514.15 |
| 6,525,307 B1 | * | 2/2003 | Evans et al. | 250/227.16 |
| 2005/0217378 A1 | * | 10/2005 | Ishikawa et al. | 73/514.01 |
| 2006/0272413 A1 | * | 12/2006 | Vaganov et al. | 73/514.01 |

FOREIGN PATENT DOCUMENTS

| | | |
|---|---|---|
| JP | 2004-177357 | 6/2004 |
| JP | 2004-354074 | 12/2004 |
| JP | 2005-345294 | 12/2005 |

OTHER PUBLICATIONS

Fujitsu MEMS 3-Axis Accelerometer Factsheet, Available online Feb. 18, 2006.*
Jaeger, "Introduction to Microelectronic Fabrication, vol. 5" 2nd. ed., pp. 78-81, Prentice Hall, 2002.*

* cited by examiner

*Primary Examiner* — Alexander Ghyka
*Assistant Examiner* — Leonard Chang
(74) *Attorney, Agent, or Firm* — Kubotera & Associates, LLC (57) ABSTRACT

An acceleration sensor includes a weight; a base portion, a beam; and a piezo resistance element. The weight is arranged to displace upon receiving acceleration. The base portion is disposed around the weight apart from the weight. The beam has one end portion connected to the weight and the other end portion connected to the base portion. The beam also has a thick layer portion and a thin layer portion having a thickness smaller than that of the thick layer portion. The piezo resistance element is disposed over the thick layer portion and the thin layer portion.

12 Claims, 8 Drawing Sheets

ACCELERATION SENSOR AND METHOD OF PRODUCING THE SAME

BACKGROUND OF THE INVENTION AND RELATED ART STATEMENT

The present invention relates to an acceleration sensor and a method of producing the same. More specifically, the present invention relates to a semiconductor acceleration sensor for detecting three-dimensional acceleration.

Figure 8A:
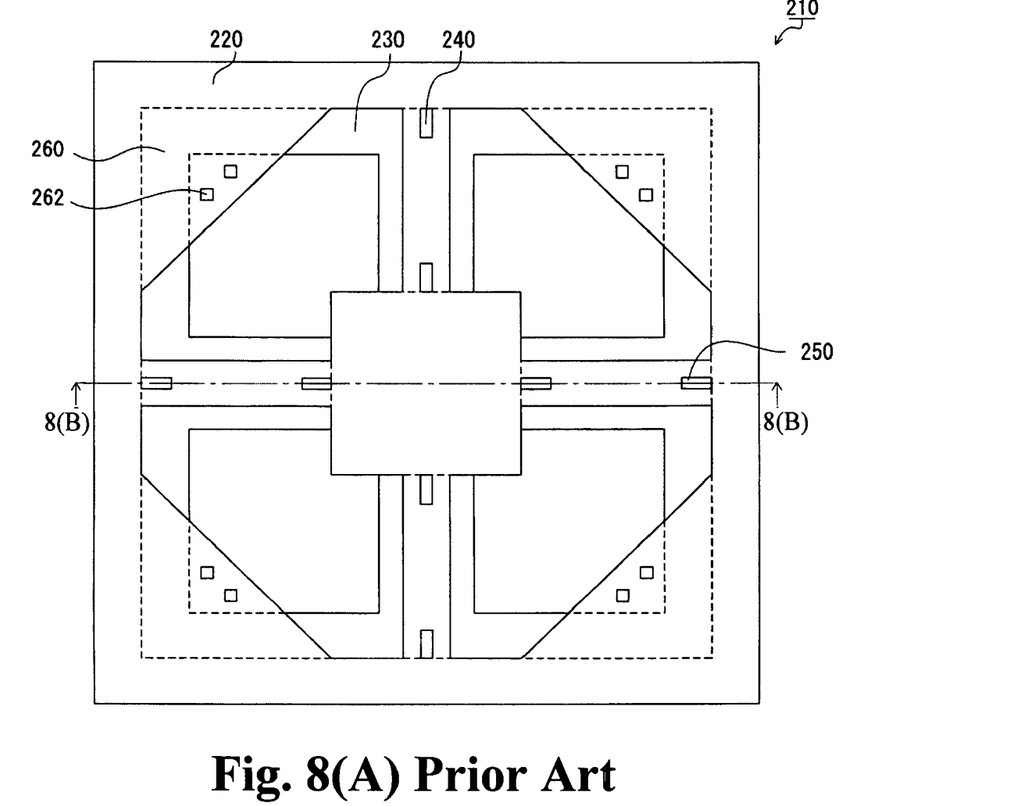
FIG. 8(A) is a schematic plan view showing a conventional acceleration sensor.
Figure 8B:
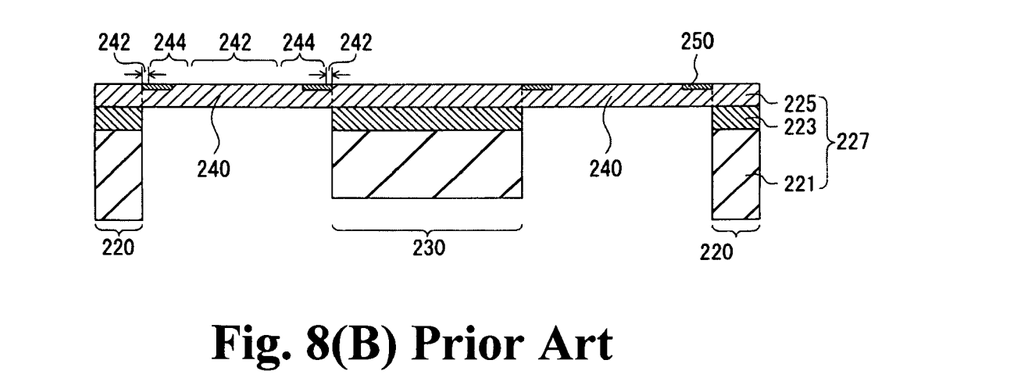
FIG. 8(B) is a sectional view taken along a projected line 8(B)-8(B) in FIG. 8(A).

FIGS. 8(a) and 8(b) are views showing an example of a conventional acceleration sensor 210 for detecting three-dimensional acceleration. The acceleration sensor 210 includes a weight 230; a base portion 220, and beams 240. The weight 230 is displaced upon receiving acceleration. The base portion 220 is disposed around the weight 230 and apart from the weight 230. The beams 240 are formed of thin wall members connecting the weight 230 and the base portion 220. More specifically, one end portions of the beams 240 are connected to the weight 230, and the other end portions of the beams 240 care connected to the base portion 220. A plurality of piezo resistance elements 250 is disposed on the beams 240 (refer to Patent Reference 1).

When acceleration is applied to the acceleration sensor 210, the weight 230 is displaced, so that the beams 240 deform accompanying with the displacement of the weight 230. When the beams 240 deform, a stress applied to the piezo resistance elements 250 changes, thereby changing resistance of the piezo resistance elements 250. In general, a change in the resistance of the piezo resistance elements 250 is very small. Accordingly, two pairs of the piezo resistance elements 250 (four elements) are formed in a bridge circuit on one of the beams 240, so that the change in the resistance of the piezo resistance elements 250 is detected as a change in a voltage.

In the acceleration sensor 210, it is possible to increase sensitivity thereof through increasing a mass of the weight 230; increasing a length of the beams 240; decreasing a width of the beams 240; or decreasing a thickness of the beams 240. However, when a width or a thickness of the beams 240 is decreased to increase sensitivity, strength of the beams 240 formed of silicon is lowered. Accordingly, when the acceleration sensor 210 receives large acceleration, the beams 240 may be easily broken.

In the conventional acceleration sensor 210, a silicon oxide layer is disposed under the weight 230 and apart from the weight 230 to obtain high sensitivity and high impact resistance at the same time. Further, stoppers 260 are disposed above the weight 230 for restricting a movement range of the weight 230.

In order to adjust sensitivity of an acceleration sensor, Patent Reference 2 discloses a configuration, in which a silicon nitride layer is formed on a beam, so that a layer thickness is adjusted.

Patent Reference 1: Japanese Patent Publication No. 2005-345294
Patent Reference 2: Japanese Patent Publication No. 2004-354074

In the conventional acceleration sensor described above, when the acceleration sensor disclosed in Patent Reference 1 is produced in a large quantity, it is difficult to obtain sufficient sensitivity and produce with a high yield due to poor impact resistance. That is, when a thickness of the beams is too large, it is difficult to obtain high sensitivity. On the other hand, when a thickness of the beams is too small, it is difficult to achieve high impact resistance, thereby reducing a yield. The sensitivity and the impact resistance have a trade-off relationship, and it is difficult to achieve high sensitivity and high impact resistance at the same time.

Even when a thickness of the beams is reduced to increase the sensitivity and a stopper is provided for improving the impact resistance, the thickness of the beams may vary during a production process. In this case, when the thickness of the beams is smaller than a specified level, the sensitivity is lowered, and when the thickness of the beams is larger than a specified level, the impact resistance is lowered.

Further, in producing the acceleration sensor, when the piezo resistance element is misplaced from a proper position, the sensitivity is lowered. More specifically, when the acceleration sensor is produced using a semiconductor laminate substrate, the piezo resistance element is produced through injecting ions from above the semiconductor laminate substrate. The proper position of the piezo resistance element is a location of the beams deforming most when the weight is displaced, i.e., a location close to the end portions of the beams. The semiconductor laminate substrate is etched from below to define locations of the end portions of the beams. Accordingly, depending on accuracy of the processes from above and below the semiconductor laminate substrate, the position of the piezo resistance element may vary.

In the acceleration sensor disclosed in Patent Reference 2, the silicon nitride layer is disposed on the beams, and the sensitivity is adjusted through changing the thickness of the silicon nitride layer. However, the acceleration sensor has the highest sensitivity when no silicon nitride layer is disposed on the beams. Accordingly, it is difficult to improve the sensitivity.

In view of the problems described above, an object of the present invention is to provide an acceleration sensor with improved sensitivity without lowering impact resistance. Further, an object of the present invention is to provide a method of producing the acceleration sensor.

Further objects and advantages of the invention will be apparent from the following description of the invention.

SUMMARY OF THE INVENTION

In order to attain the objects described above, it is found that a beam deforms to a greater extent (strain) when the beam has a thick layer portion and a thin layer portion, as opposed to the beam has a uniform layer thickness. According to the present invention, an acceleration sensor includes a weight; a base portion, a beam; and a piezo resistance element. The weight is arranged to displace upon receiving acceleration. The base portion is disposed around the weight apart from the weight. The beam has one end portion connected to the weight and the other end portion connected to the base portion. The beam also has a thick layer portion and a thin layer portion having a thickness smaller than that of the thick layer portion. The piezo resistance element is disposed over the thick layer portion and the thin layer portion.

According to the present invention, a method of producing an acceleration sensor includes the steps of: preparing a semiconductor laminate substrate in which a first semiconductor layer, a silicon oxide layer, and a second semiconductor layer are laminated in this order; providing a second weight area, a second base portion area around the second weight area and away from the second weight area, a beam area connected the second weight area and the second base portion area, and a second opening area adjacent to the second weight area, the second base portion area, and the beam area on the second semiconductor layer; removing the second semiconductor layer in the second opening area; removing the silicone oxide layer in the second opening area; forming a thick layer portion and a thin layer portion in the second semiconductor layer in the beam area; forming a piezo resistance element over the thick layer portion and the thin layer portion; providing a first weight area, a first opening area around the first weight area, and a first base portion area around the first opening area on the first semiconductor layer; and removing the first semiconductor layer in the first opening area.

In the present invention, the beam may have the thick layer portion having, for example, a thickness of 15 μm and the thin layer portion having a thickness of 5 μm. When the beam has the thick layer portion and the thin layer portion, the beam deforms predominantly at a boundary between the thick layer portion and the thin layer portion. Accordingly, it is possible to improve sensitivity as compared with an acceleration sensor having a beam with a uniform thickness of 15 μm or even a beam with a uniform thickness of 5 μm. Further, it is possible to improve impact resistance as compared with an acceleration sensor having a beam with a uniform thickness of 5 μm. Therefore, in the acceleration sensor of the present invention, it is possible to improve the sensitivity without lowering the impact resistance.

In the method of the present invention, after the thin layer portion is formed in the beam from am upper surface, the piezo resistance element is formed at a boundary between the thin layer portion and the thick layer portion.

In a conventional method of producing an acceleration sensor, upon receiving acceleration, largest deformation occurs at both end portions of a beam connected to a weight or a base portion. The portions having the largest deformation are defined through an etching process from a lower surface. Accordingly, depending on accuracy of positioning a front surface and a backside surface, sensitivity may vary, thereby lowering yield.

On the other hand, in the method of the present invention, upon receiving acceleration, the largest deformation occurs at the boundary between the thin layer portion and the thick layer portion. Accordingly, it is possible to achieve accuracy same as that in a normal exposure device, thereby stabilizing sensitivity and improving yield.

BRIEF DESCRIPTION OF THE DRAWINGS

FIGS. 3(A) to 3(C) are schematic plan views showing the acceleration sensor according to the embodiment of the present invention, wherein FIG. 3(A) is a schematic plan view showing a second semiconductor layer;

DETAILED DESCRIPTION OF PREFERRED EMBODIMENTS

Hereunder, embodiments of the present invention will be explained with reference to the accompanying drawings. The drawings schematically show shapes, sizes, and positional relationships of constituting component, and the invention is not limited to those shown in the drawings. In the drawings, a size, a shape, and an arrangement of the constituting components are schematically shown for explanation of the present invention. Specific materials, conditions, and numerical conditions described in the following description are just examples.

With reference to FIGS. 1, 2(A)-2(c), and 3(a)-3(D), an acceleration sensor 10 or a three-dimensional acceleration sensor of the present invention will be explained.

Figure 1:
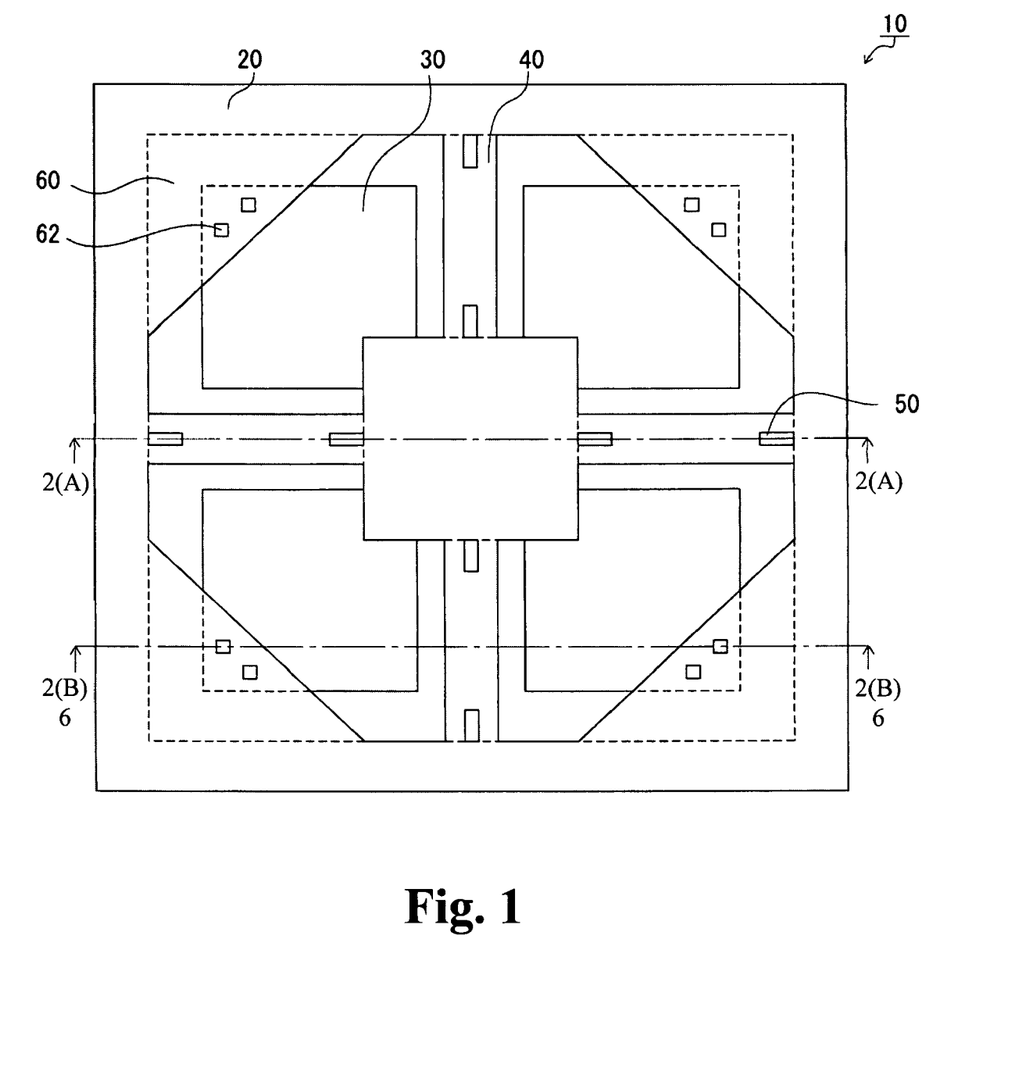
FIG. 1 is a schematic plan view showing a configuration of an acceleration sensor according to an embodiment of the present invention.
Figure 2A:
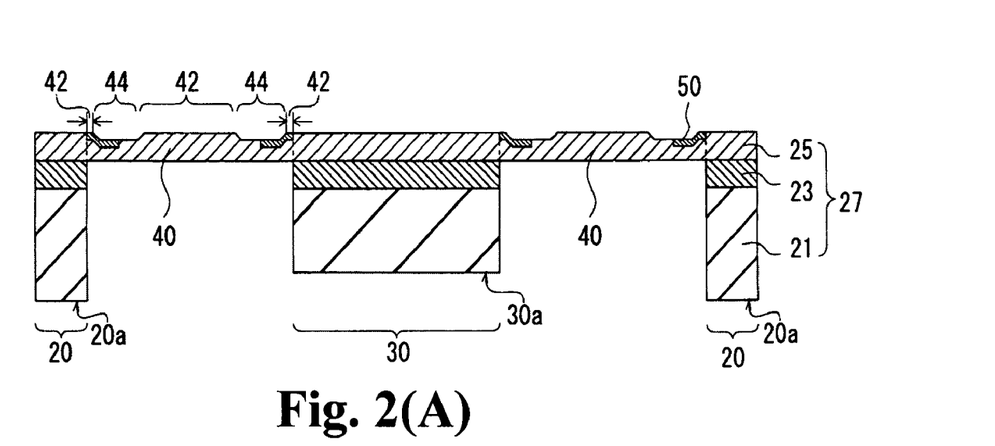
FIG. 2(A) is a schematic sectional view of the acceleration sensor according to the embodiment of the present invention taken along a line 2(A)-2(A) in FIG. 1.
Figure 2B:
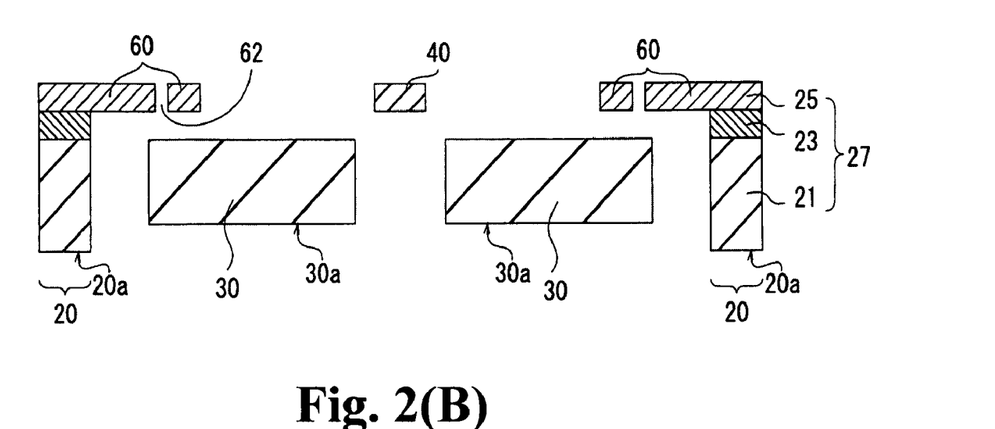
FIG. 2(B) is a schematic sectional view of the acceleration sensor according to the embodiment of the present invention taken along a line 2(B)-2(B) in FIG. 1.

FIG. 1 is a schematic plan view showing a configuration of the acceleration sensor 10 according to an embodiment of the present invention. FIG. 2(A) is a schematic sectional view of the acceleration sensor 10 according to the embodiment of the present invention taken along a projected line 2(A)-2(A) in FIG. 1, and FIG. 2(B) is a schematic sectional view of the acceleration sensor 10 according to the embodiment of the present invention taken along a projected line 2(B)-2(B) in FIG. 1.

In the acceleration sensor 10, a semiconductor laminate substrate 27 is formed of a first semiconductor layer 21, a silicon oxide layer 23, and a second semiconductor layer 25 laminated respectively in this order. The acceleration sensor 10 further includes a weight 30, a base portion 20, beams 40, and stoppers 60.

Figure 3A:
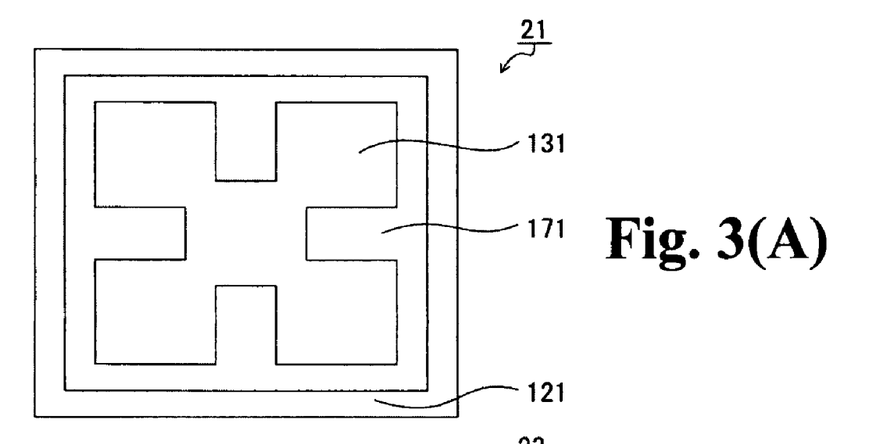
FIG. 3(A) is a schematic plan view showing a first semiconductor layer.
Figure 3B:
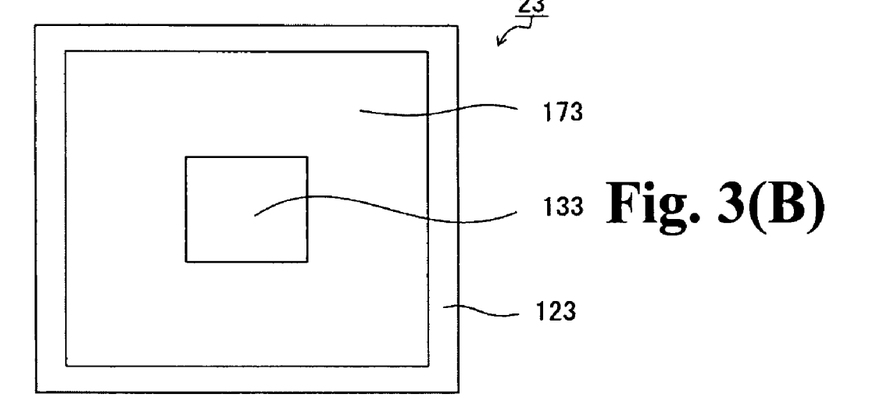
FIG. 3(B) is a schematic plan view showing a silicon oxide layer.
Figure 3C:
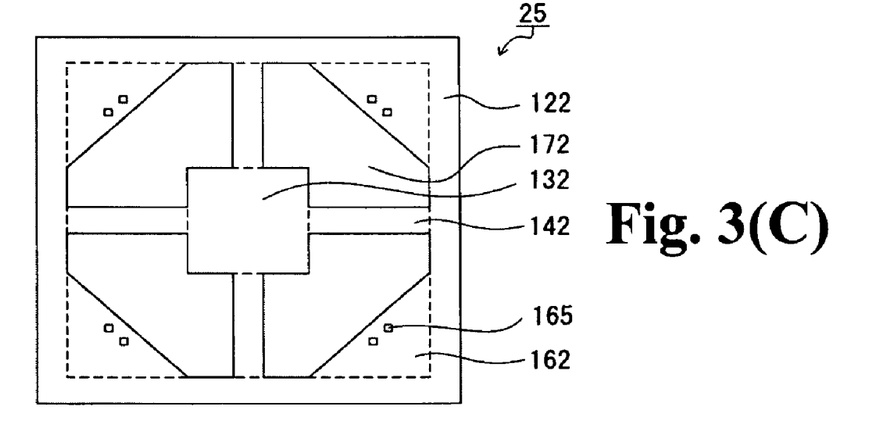

FIGS. 3(A) to 3(C) are schematic plan views showing the acceleration sensor 10 according to the embodiment of the present invention, wherein FIG. 3(A) is a schematic plan view showing the first semiconductor layer 21, FIG. 3(B) is a schematic plan view showing the silicon oxide layer 23, and FIG. 3(A) is a schematic plan view showing the second semiconductor layer 25. The first semiconductor layer 21 is formed of, for example, a silicon layer having a thickness of 500 μm. The silicon oxide layer 23 has a thickness of, for example, 4 μm. The second semiconductor layer 25 is formed of, for example, a silicon layer having a thickness of 15 μm.

In the embodiment, the weight 30 is displaced upon receiving acceleration. The base portion 20 is disposed around the weight 30 and apart from the weight 30. Each of the beams 40 is formed of a thin wall member, and has one end portion connected to one of the weight 30 and the other end portion connected to the base portion 20. A plurality of pairs of piezo resistance elements 50 is formed on the beams 40.

In the embodiment, electrodes are provided for detecting a change in a resistance of the piezo resistance elements 50 through a process similar to that of a conventional acceleration sensor, and an explanation thereof is omitted. Further, wirings are provided for connecting the piezo resistance elements 50 and the electrodes through a process similar to that of a conventional acceleration sensor, and an explanation thereof is omitted.

In the embodiment, the first semiconductor layer 21 has a first weight area 131; a first opening area 171 around the first weight area 131; and a first base portion area 121 surrounding the first opening area 171. The first semiconductor layer 21 in the first weight area 131 includes a part of a plurality of layers constituting the weight 30, and has a square shape having a recess portion at a center of each side thereof. The first semiconductor layer 21 in the first base portion area 121 includes a part of a plurality of layers constituting the base portion 20, and is disposed away from the first weight area 131. The first opening area 171 is disposed between the first base portion area 121 and the first weight area 131.

As shown in FIGS. 2(A) and 2(B), a lower surface 20a of the base portion 20 is situated below a lower surface 30a of the weight 30. That is, the first base portion area 121 has a thickness larger than that of the first weight area 131. However, the present invention is not limited to the configuration. For example, a layer such as a silicon oxide layer having a shape same as that of the first base portion area 121 may be disposed under the first base portion area 121, thereby changing the locations of the lower surfaces of the base portion 20 and the weight 30. When a silicon oxide layer is disposed on the lower surface 20a of the base portion 20 over the first base portion area 121, the first weight area 131, and the first opening area 171, it is possible to restrict the weight 30 from moving downward.

In the embodiment, the silicon oxide layer 23 has a third weight area 133; a third opening area 173 around the third weight area 133; and a third base portion area 123 surrounding the third opening area 173. The silicon oxide layer 23 in the third weight area 133 includes a part of a plurality of layers constituting the weight 30, and has a square shape. The silicon oxide layer 23 in the third base portion area 123 includes a part of a plurality of layers constituting the base portion 20. The third base portion area 123 is disposed away from the third weight area 133, and has a size and a dimension same as those of the first base portion area 121.

In the embodiment, the second semiconductor layer 25 has a second weight area 132; second opening areas 172; a second base portion area 122; beam areas 142; and stopper areas 162. The silicon oxide layer 23 in the second weight area 132 includes a part of a plurality of layers constituting the weight 30, and has a square shape same as that of the third weight area 133. The second semiconductor layer 25 in the second base portion area 122 includes a part of a plurality of layers constituting the base portion 20. The second base portion area 122 is connected to the second weight area 132 through the beam areas 142, and has a size and a dimension same as those of the third base portion area 123.

Note that, due to an etching process for forming the stoppers 60, the third weight area 133 and the third base portion area 123 may have a size smaller than that of the second weight area 132 and the second base portion area 122, respectively.

In the embodiment, the beam areas 142 have a rectangular shape, and the second semiconductor layer 25 in the beam areas 142 constitutes the beams 40. The piezo resistance elements 50 are formed in the beams 40.

In the embodiment, the stopper areas 162 are connected to the second base portion area 122, and are apart from the beam areas 142 and the second weight area 132. The second semiconductor layer 25 in the stopper areas 162 constitutes the stoppers 60. The stoppers 60 are disposed above the first weight area 131 for restricting the weight 30 from moving upward. A plurality of etching openings 62 is formed in the stoppers 60. When it is not necessary to provide the stoppers 60 in the second semiconductor layer 25, the stopper areas 162 may be omitted. The second opening areas 172 are surrounded with the stopper areas 162, the second base portion area 122, the second weight area 132, and the beam areas 142.

In the embodiment, the base portion 20 is formed of the first semiconductor layer 21 in the first base portion area 121, the silicon oxide layer 23 in the third base portion area 123, and the second semiconductor layer 25 in the second base portion area 122. Further, the weight 30 is formed of the first semiconductor layer 21 in the first weight area 131, the silicon oxide layer 23 in the third weight area 133, and the second semiconductor layer 25 in the second weight area 132.

In the embodiment, as shown in FIG. 2(A), each of the beams 40 includes a thick layer portion 42 having a thickness of 15 μm and a thin layer portion 44 having a thickness smaller than that of the thick layer portion 42. The thickness of the thick layer portion 42 is adjusted according to a length and a width of the beams 40, and a mass of the weight 30, for example, in a range of 5 to 7 μm. Boundaries between the thick layer portion 42 and the thin layer portion 44 where a thickness of the beams 40 changes are situated at both end portions of each of the beams 40 in a longitudinal direction thereof. The longitudinal direction of the beams 40 extends from the portions of the beams 40 connected to the weight 30 to the portions of the beams 40 connected to the base portion 20.

When the weight 30 is displaced, the deformation of the beams 40 becomes a maximum level at the both end portions thereof connected to the base portion 20 and the weight 30, respectively. Accordingly, in general, the piezo resistance elements 50 are disposed at the end portions of the beams 40. In the embodiment, the boundaries between the thick layer portion 42 and the thin layer portion 44 are situated at the end portions of each of the beams 40 where the piezo resistance elements 50 are disposed. That is, the deformation of the beams 40 is concentrated at the boundaries between the thick layer portion 42 and the thin layer portion 44 where the piezo resistance elements 50 are disposed. Accordingly, it is possible to improve sensitivity relative to acceleration.

In the embodiment, it is preferred that the boundaries between the thick layer portion 42 and the thin layer portion 44 are situated at locations where the deformation of each of the beams 40 becomes a maximum level when each of the beams 40 is formed in a flat member. However, even when the boundaries are shifted from the maximum deformation locations, if the shift is within a range of 5 μm, which is accuracy of positioning a front surface and a backside surface in a manufacturing process (described later), it is possible to minimize influence of the shift on the sensitivity.

Figure 4A:
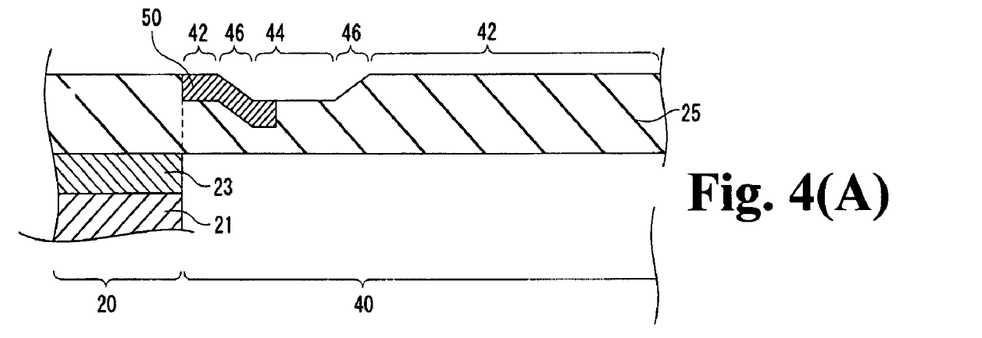
FIGS. 4(A) to 4(D) are schematic sectional views showing examples of a beam of the acceleration sensor according to the embodiment of the present invention.
Figure 4B:
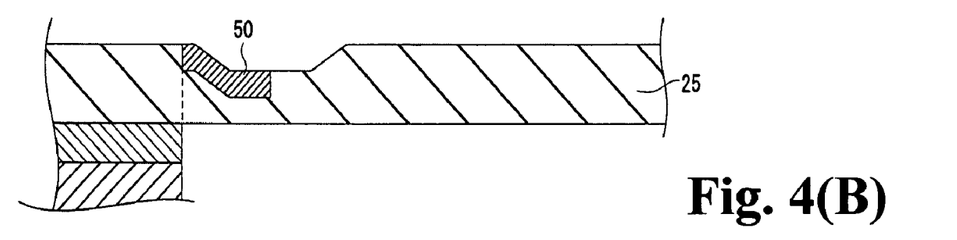
Figure 4C:
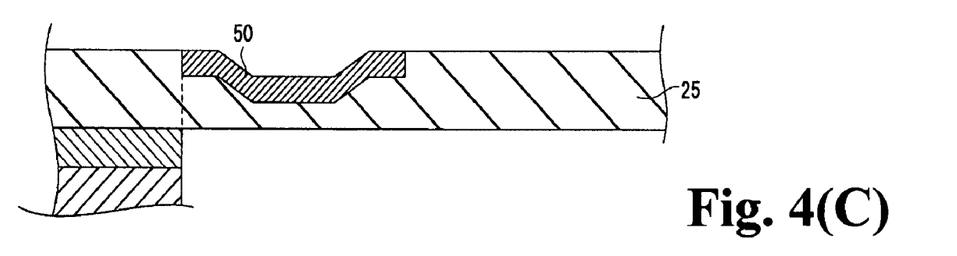
Figure 4D:
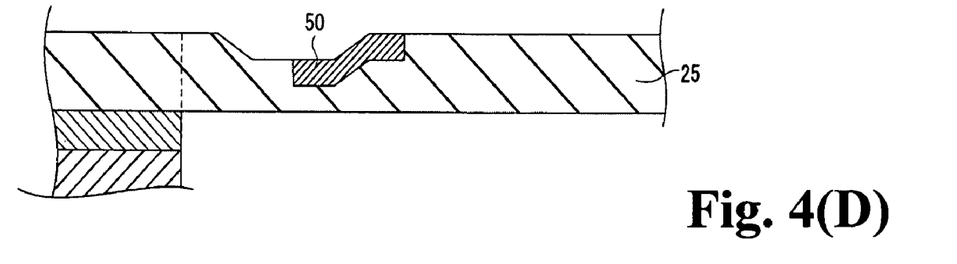
Figure 5A:
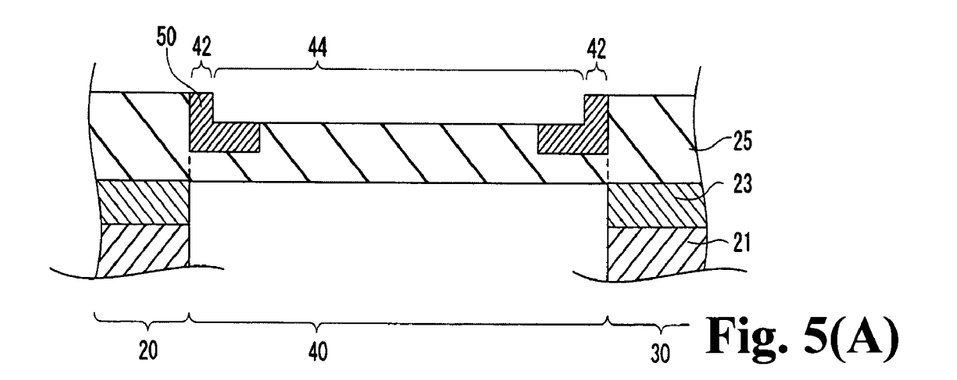
FIGS. 5(A) to 5(C) are schematic sectional views showing examples of the beam of the acceleration sensor according to the embodiment of the present invention.
Figure 5B:
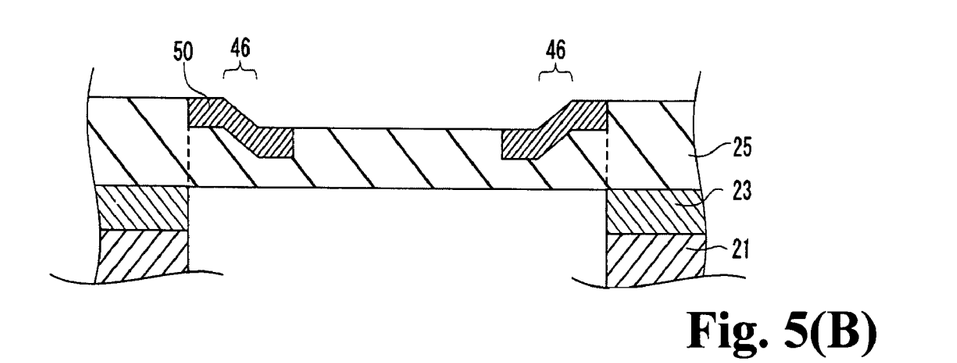
Figure 5C:
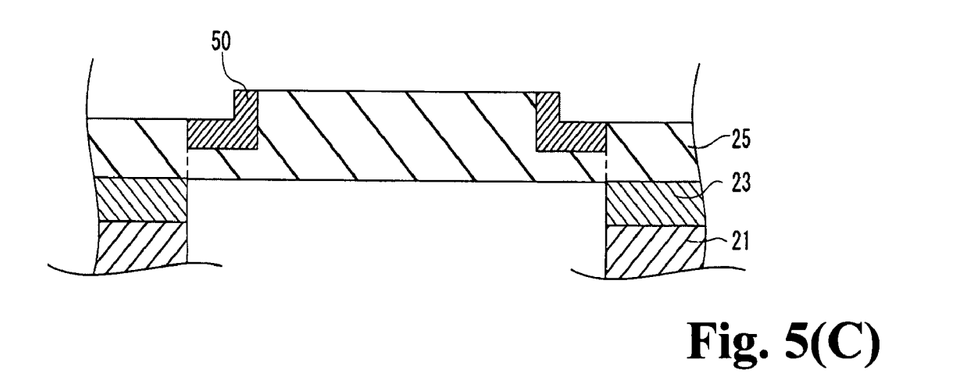

With reference to FIGS. 4(A) to 4(D) and 5(A) to 5(C), the beams 40 will be explained in more detail. FIGS. 4(A) to 4(D) are schematic sectional views showing examples of the beam 40 of the acceleration sensor 10 according to the embodiment of the present invention. FIGS. 5(A) to 5(C) are schematic sectional views showing examples of the beam 40 of the acceleration sensor 10 according to the embodiment of the present invention.

As shown in FIGS. 4(A) to 4(D), two of the thin layer portions 44 are situated away from each other at the both end portions of the beam 40 in the longitudinal direction thereof, and the thick layer portions 42 are situated at both sides of the thin layer portions 44 in the longitudinal direction of the beam 40.

In the embodiment, the piezo resistance element 50 is situated over the thin layer portion 44 and the thick layer portion 42. That is, it is sufficient that the piezo resistance element 50 is situated in an area including the boundary between the thin layer portion 44 and the thick layer portion 42.

More specifically, as shown in FIG. 4(A), the piezo resistance element 50 may be situated uniformly over the thick layer portion 42 and the thin layer portion 44. Alternatively, as shown in FIG. 4(B), the piezo resistance element 50 may be situated in the thin layer portion 44 in an area larger than that in the thick layer portion 42. Further, as shown in FIG. 4(C), the piezo resistance element 50 may be situated over the thin layer portion 44 and extend to the thick layer portions 42 at both sides of the thin layer portion 44.

In FIG. 4(A), the piezo resistance element 50 extends from the thin layer portion 44 toward the thick layer portion 42 on a side of the base portion 20. Alternatively, as shown in FIG. 4(D), the piezo resistance elements 50 may extend from the thin layer portion 44 toward the weight 30, i.e., over the thick layer portion 42 at a central portion of the beams 40.

In the acceleration sensor 10 according to the embodiment, the boundaries between the thick layer portions 42 and the thin layer portions 44 are situated at the both end portions of the beams 40 where the deformation of the beams 40 increases when the weight 30 is displaced. Accordingly, the thin layer portions 44 may be situated at the both end portions of the beam 40 to be apart from each other. Alternatively, as shown in FIGS. 5(A) and 5(B), the thick layer portions 42 may be situated at the both end portions of the beam 40, and the thin layer portion 44 is situated over a whole length between the both end portions of the beam 40.

Further, as shown in FIG. 5(C), the thin layer portions 44 may be situated at the both end portions of the beam 40, and the thick layer portion 42 is situated over a whole length between the both end portions of the beam 40. The boundaries between the thick layer portion 42 and the thin layer portions 44 may be situated exactly at the both end portions of the beams 40.

As shown in FIGS. 4(A) to 4(D) and 5(B), when boundary portions 46, where the thickness of the beams 40 gradually changes, are disposed between the thick layer portion 42 and the thin layer portions 44, it is possible to reduce a risk in which the boundaries between the thick layer portion 42 and the thin layer portions 44 break. In this case, the boundaries between the thick layer portion 42 and the thin layer portions 44 may extend over the end portions of the beam 40 and the weight 30 or the base portion 20.

In the embodiment, the beams 40 have a rectangular shape, and may have other shapes. For example, the both end portions of the beam 40 connected to the weight 30 or the base portion 20 may have a width gradually or in stepwise increasing toward the weight 30 or the base portion 20. In this case, the both end portions of the beam 40 connected to the weight 30 or the base portion 20 at a right angle may have corners having a curved shape or a step shape, thereby reducing stress concentration and prevent the beams 40 from braking.

As described above, in the acceleration sensor 10 according to the embodiment of the present invention, the beams 40 have the thick layer portions 42 and the thin layer portions 44 having a thickness smaller than that of the thick layer portions 42. When the beams 40 have the thick layer portions 42 and the thin layer portions 44, it is possible to concentrate the deformation of the beams 40 at the boundaries between the thick layer portions 42 and the thin layer portions 44.

For example, when the thick layer portions 42 have a thickness of 15 μm and the thin layer portions 44 have a thickness of 5 μm, it is possible to improve sensitivity as opposed to a beam having a uniform thickness of 15 μm or even having a uniform thickness of 5 μm. Further, it is possible to improve impact resistance as opposed to a beam having a uniform thickness of 5 μm. Accordingly, in the acceleration sensor 10 according to the embodiment of the present invention, it is possible to improve sensitivity without lowering impact resistance.

With reference to FIGS. 6(A) to 6(D) and 7(A) to 7(D), a method of producing the acceleration sensor 10 according to the embodiment of the present invention will be explained next.

FIGS. 6(A) to 6(D) are schematic sectional views showing the acceleration sensor 10 according to the embodiment of the present invention during a manufacturing process taken along a line 6-6 in FIG. 1. FIGS. 7(A) to 7(D) are schematic sectional views showing the beam 40 of the acceleration sensor 10 while forming the thin layer portion 44 according to the embodiment of the present invention during the manufacturing process.

Figure 6A:
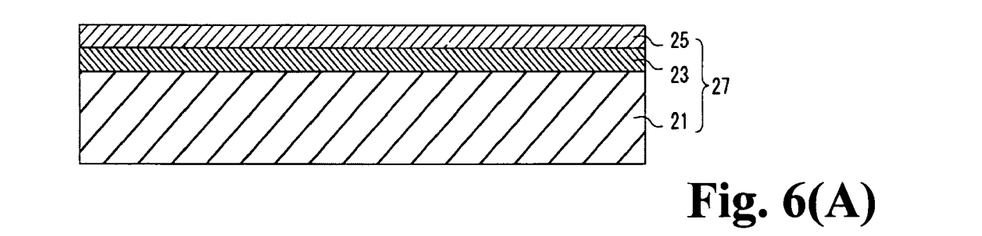
FIGS. 6(A) to 6(D) are schematic sectional views showing the acceleration sensor according to the embodiment of the present invention during a manufacturing process taken along a line 6-6 in FIG. 1.

As shown in FIG. 6(A), first, the first semiconductor layer 21, the silicon oxide layer 23, and the second semiconductor layer 25 are laminated in this order to form the semiconductor laminate substrate 27.

In the next step, the second weight area 132, the second base portion area 122, the beam areas 142, the stopper areas 162, and the second opening areas 172 are provided on the second semiconductor layer 25 (refer to FIG. 3(C)). In the embodiment, the second weight area 132 has a square shape, and the second base portion area 122 is disposed around the second weight area 132 and away from the second weight area 132. Further, the beam areas 142 have a rectangular shape connecting the second weight area 132 and the second base portion area 122. The stopper areas 162 are connected to the second base portion area 122, and are away from the beam areas 142 and the second weight area 132. The second opening areas 172 are surrounded with the stopper areas 162, the second base portion area 122, the second weight area 132, and the beam areas 142.

Figure 6B:
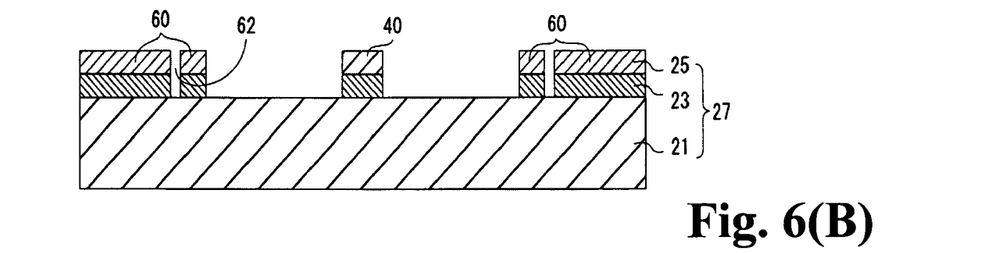

In the next step, as shown in FIG. 6(B), the semiconductor laminate substrate 27 is processed with photolithography and dry etching from above to remove the second semiconductor layer 25 in the second opening areas 172. At the same time, the etching openings 62 are formed in the second semiconductor layer 25 in the stopper areas 162. Further, through dry etching, the silicon oxide layer 23 in the second opening areas 172 is removed.

Figure 6C:
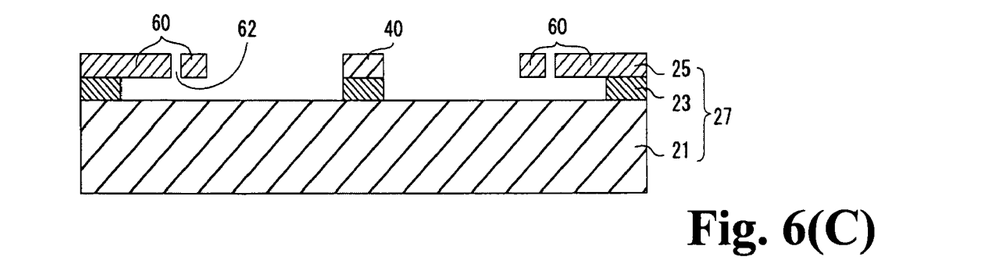

In the next step, as shown in FIG. 6(C), fluoric acid is introduced through the etching openings 62 and the second opening areas 172, so that the silicon oxide layer 23 in the stopper areas 162 is removed through wet etching.

In the next step, the thin layer portions 44 are formed in the beam areas 142 through a method such as LOCOS method. The LOCOS method for forming the thin layer portions 44 will be explained with reference to FIGS. 7(A) to 7(D).

Figure 7A:
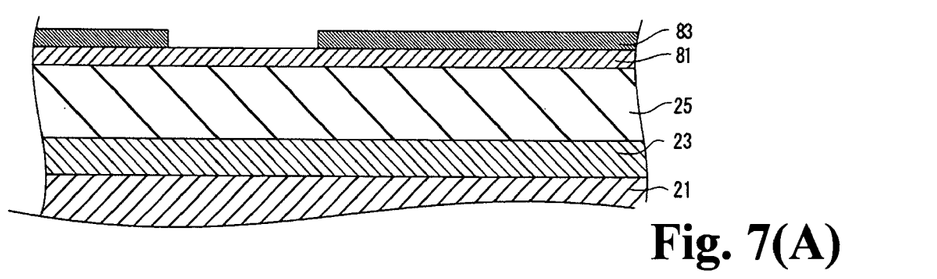
FIGS. 7(A) to 7(D) are schematic sectional views showing the beam of the acceleration sensor according to the embodiment of the present invention during the manufacturing process.

First, as shown in FIG. 7(A), after a silicon oxide layer 81 is formed on the second semiconductor layer 25 in the beam area 142, a silicon nitride layer 83 is formed through a CVD method. Then, the silicon nitride layer 83 in the area corresponding to the thin layer portion 44 is removed through photolithography and dry etching.

Figure 7B:
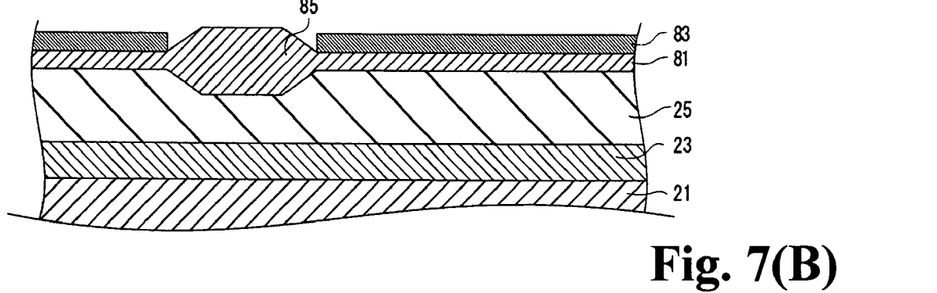

In the next step, as shown in FIG. 7(B), an oxide layer (LOCOS layer) 85 having a large thickness is formed at the thin layer portion 44 through thermal oxidation.

Figure 7C:
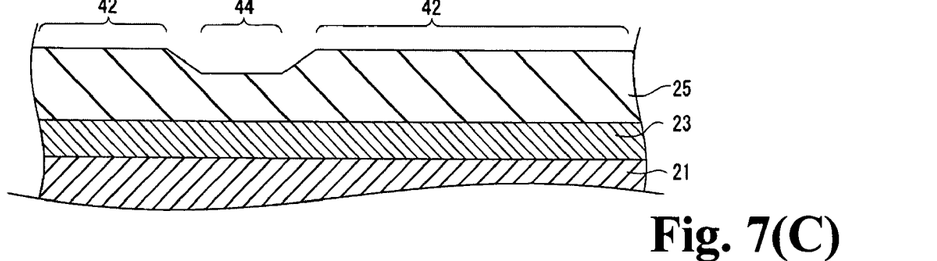

In the next step, as shown in FIG. 7(C), the silicon oxide layer 81, the silicon nitride layer 83, and the LOCOS layer 85 are removed to form the thin layer portion 44 in the second semiconductor layer 25 in the beam area 142.

In the embodiment, the thin layer portion 44 is formed through the LOCOS method, and may be formed through other method such as etching. When the thin layer portion 44 is formed through the LOCOS method, it is possible to form the boundary portions 46 having a thickness gradually changing between the thick layer portions 42 and the thin layer portion 44. Accordingly, it is possible to reduce a risk in which step portions between the thick layer portions 42 and the thin layer portion 44 may break.

In the next step, the piezo resistance element 50 is formed in the beam area 142 through a well-known conventional method. First, a thermal oxide layer is formed on the second semiconductor layer 25 in the beam area 142 through thermal oxidation under a humid environment at 1000° C. Then, an opening portion is formed in the thermal oxide layer through photolithography and dry etching to expose a surface of the second semiconductor layer 25. After a P-type impurity such as boron (B) is injected into the exposed surface of the second semiconductor layer 25 in the opening portion, a diffusion layer is formed through a thermal diffusion process. Afterward, wirings electrically connected are formed on the diffusion layer through a well-known conventional method to form the piezo resistance element 50.

Figure 7D:
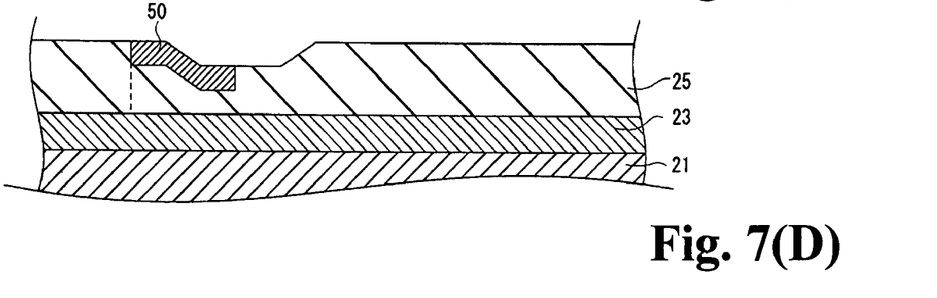

As shown in FIG. 7(D), the piezo resistance element 50 is disposed over the thick layer portions 42 and the thin layer portion 44, where the deformation of the beam 40 becomes a maximum level upon receiving acceleration on the weight 30. It is suffice that the piezo resistance element 50 is disposed over the thick layer portions 42 and the thin layer portion 44, i.e., the boundary portions between the thick layer portions 42 and the thin layer portion 44.

In the next step, the first weight area 131; the first opening area 171 around the first weight area 131; and the first base portion area 121 surrounding the first opening area 171 are provided on the first semiconductor layer 21 (refer to FIG. 3(A)). The first weight area 131 has a square shape having a recess portion at a center of each side thereof. The first base portion area 121 is disposed away from the first weight area 131. The first opening area 171 is disposed between the first base portion area 121 and the first weight area 131.

In the next step, the semiconductor laminate substrate 27 is processed with photolithography and dry etching from below to remove the first semiconductor layer 21 in the first opening area 171. Further, through dry etching, the silicon oxide layer 23 in the beam areas 142 is removed.

In the embodiment, downward displacement of the weight 30 is restricted according to positions of lower surfaces of the base portion 20 and the weight 30. Accordingly, it is configured such that the position of the lower surface of the base portion 20 is situated below the position of the lower surface of the weight 30 according to an amount of the displacement of the weight 30. To this end, before the first semiconductor layer 21 in the first opening area 171 is removed, the first semiconductor layer 21 in the first opening area 171 and the first weight area 131, i.e., portions other than the first base portion area 121, is etched, thereby forming step portions between the first base portion area 121 and the first weight area 131 or the first opening area 171.

Figure 6D:
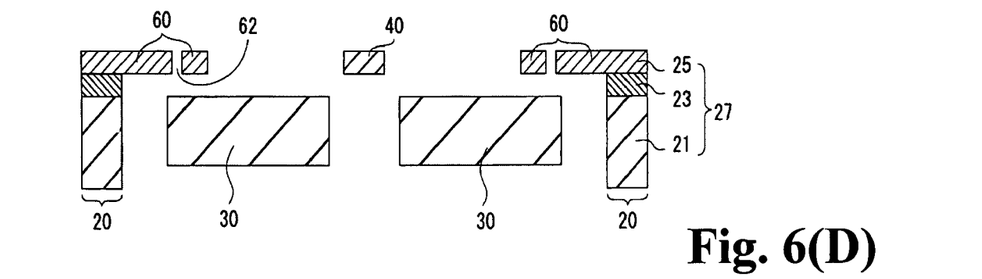

Alternatively, it may be configured such that the position of the lower surface in the first weight area 131 is situated at a level same as that in the first base portion area 121, and a silicon oxide layer may be disposed on the lower surface of the first semiconductor layer 21 in the first base portion area 121. In this case, the silicon oxide layer is formed on a lower surface of the semiconductor laminate substrate 27 in advance. Before the first semiconductor layer 21 is etched, the silicon oxide layer 23 in the first weight area 131 and the first opening area 171 is removed through photolithography and dry etching. Afterward, the first semiconductor layer 21 in the first opening area 171 is removed as shown in FIG. 6(D).

In the method of producing the acceleration sensor 10 according to the embodiment of the present invention, after the thin layer portions 44 are formed in the beams 40 from the upper surface, the piezo resistance elements 50 are formed at the boundaries between the thick layer portions 42 and the thin layer portions 44.

In a conventional method of producing an acceleration sensor, when a weight receives acceleration, deformation of a beam becomes a maximum level at connecting portions of both end portions of the beam relative to the weight and a base portion. The connecting portions are determined according to an etching process from a lower surface. Accordingly, sensitivity may vary according to accuracy of positioning a front surface and a backside surface, thereby lowering yield.

On the other hand, the method of producing the acceleration sensor 10 according to the embodiment of the present invention, when the weight 30 receives acceleration, the deformation of the beams 40 becomes a maximum level at the boundaries between the thick layer portions 42 and the thin layer portions 44 formed from the upper surface. Accordingly, it is possible to achieve accuracy same as that in a normal exposure device, thereby stabilizing sensitivity and improving yield.

According to the present invention, there are provided the following method of producing an acceleration sensor:

(1) A method of producing an acceleration sensor comprises the steps of: preparing a semiconductor laminate substrate in which a first semiconductor layer, a silicon oxide layer, and a second semiconductor layer are laminated in this order; providing a second weight area, a second base portion area around the second weight area and away from the second weight area, a beam area connected the second weight area and the second base portion area, and a second opening area adjacent to the second weight area, the second base portion area, and the beam area on the second semiconductor layer; removing the second semiconductor layer in the second opening area; removing the silicone oxide layer in the second opening area; forming a thick layer portion and a thin layer portion in the second semiconductor layer in the beam area; forming a piezo resistance element over the thick layer portion and the thin layer portion; providing a first weight area, a first opening area around the first weight area, and a first base portion area around the first opening area on the first semiconductor layer; and removing the first semiconductor layer in the first opening area.

Further, in the method of producing an acceleration sensor according to the method (1), the step of forming the thick layer portion and the thin layer portion comprises the steps of laminating a silicon oxide layer and a silicon nitride layer on the second semiconductor layer in the beam area, removing the silicon nitride layer in an area where the thin layer portion is formed, increasing a thickness of the silicon oxide layer in the area through thermal oxidation, and removing the silicon oxide layer in the area.

Still further, in the method of producing an acceleration sensor according to the method (1), in the step of forming the thick layer portion and the thin layer portion, a first thin layer portion and a second thin layer portion are formed at both end portions of a beam in a longitudinal direction thereof so that the thick layer portion being situated between the first thin layer portion and the second thin layer portion.

Still further, in the method of producing an acceleration sensor according to the method (1), in the step of forming the thick layer portion and the thin layer portion, a first thick layer portion and a second thick layer portion are formed at both end portions of a beam in a longitudinal direction thereof so that the thin layer portion being situated between the first thick layer portion and the second thick layer portion.

Still further, in the method of producing an acceleration sensor according to the method (1), in the step of forming the thick layer portion and the thin layer portion, a boundary portion is formed between the thick layer portion and the thin layer portion such that the boundary portion has a thickness changing gradually.

The disclosure of Japanese Patent Application No. 2006-117935, filed on Apr. 21, 2006, is incorporated in the application.

While the invention has been explained with reference to the specific embodiments of the invention, the explanation is illustrative and the invention is limited only by the appended claims.

What is claimed is:

1. An acceleration sensor, comprising:
a weight for displacing upon receiving acceleration;
a base portion disposed around the weight apart from the weight,
a beam having a first surface and a second surface opposite to the first surface, said beam having one end portion connected to the weight and the other end portion connected to the base portion, said beam including a thick portion, a thin portion having a thickness smaller than that of the thick portion in a non-deformed state of the beam, and a slope portion between the thick portion and the thin portion, said slope portion having a thickness changing gradually from that of the thick portion to that of the thin portion in the non-deformed state, said slope portion having a sloped surface only on the first surface so that the second surface has one single flat surface; and
a piezo resistance element embedded in the thick portion, the slope portion, and the thin portion,
wherein said thick portion includes a first thick portion, a second thick portion, and a third thick portion between the first thick portion and the second thick portion, said first thick portion and said second thick portion being situated at both the one end portion and the other end portion of the beam in a longitudinal direction thereof, said thin portion being situated between the first thick portion and the third thick portion, and the second thick portion and the third thick portion.

2. The acceleration sensor according to claim 1, wherein said beam includes a first thin portion and a second thin portion, said third thick portion being situated between the first thin portion and the second thin portion.

3. The acceleration sensor according to claim 1, wherein said sloped surface extends between the thick portion and the thin portion.

4. The acceleration sensor according to claim 1, wherein said piezo resistance element has a crank shape or a bent shape along the thick portion, the slope portion, and the thin portion.

5. An acceleration sensor, comprising:
a weight for displacing upon receiving acceleration;
a base portion disposed around the weight apart from the weight; and
a beam having a first surface and a second surface opposite to the first surface, said beam having one end portion connected to the weight and the other end portion connected to the base portion, said beam including a piezo resistance element embedded therein, said beam further including a thick portion, a thin portion, and a slope portion between the thick portion and the thin portion, so that a thickness of the beam at the thick portion is greater than that of the beam at the thin portion in a non-deformed state of the beam, said piezo resistance element extending into both the thick portion and the thin portion, said slope portion having a sloped surface only on the first surface so that the second surface has one single flat surface.

6. The acceleration sensor according to claim 5, wherein said beam includes a first thin portion and a second thin portion at both end portions thereof in a longitudinal direction thereof, said thick portion being situated between the first thin portion and the second thin portion.

7. The acceleration sensor according to claim 5, wherein said beam includes a first thick portion and a second thick portion at both end portions thereof in a longitudinal direction thereof, said thin portion being situated between the first thick portion and the second thick portion.

8. The acceleration sensor according to claim 5, wherein said slope portion has a thickness changing gradually from that of the thick portion to that of the thin portion in the non-deformed state so that the piezo resistance element is embedded in the thick portion, the slope portion, and the thin portion.

9. The acceleration sensor according to claim 5, wherein said sloped surface extends between the thick portion and the thin portion.

10. The acceleration sensor according to claim 5, wherein said piezo resistance element has a crank shape or a bent shape with offsetting angles along the thick portion, the slope portion, and the thin portion.

11. An acceleration sensor, comprising:
a weight for displacing upon receiving acceleration;
a base portion disposed around the weight apart from the weight;
a beam disposed between the weight and the base portion, said beam having a first surface and a second surface opposite to the first surface, said beam including a trench portion at both end portions thereof in a longitudinal direction thereof only on the first surface so that the second surface has one single flat surface, said trench portion having a flat bottom surface and at least one oblique sidewall; and
a piezo resistance element embedded in the beam and extending through the oblique sidewall into the flat bottom surface.

12. The acceleration sensor according to claim 11, wherein said piezo resistance element has a crank shape or a bent shape with offsetting angles along the flat bottom surface and the one oblique sidewall.

* * * * *